United States Patent
Baldemair

(10) Patent No.: US 10,862,705 B2
(45) Date of Patent: Dec. 8, 2020

(54) CARRIER SENSE MULTIPLE ACCESS (CSMA) WITH FREQUENCY DIVISION MULTIPLEXING FOR DATA TRANSMISSION IN WIRELESS COMMUNICATION

(71) Applicant: Telefonaktiebolaget LM Ericsson (publ), Stockholm (SE)

(72) Inventor: Robert Baldemair, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 15/566,326

(22) PCT Filed: Apr. 16, 2015

(86) PCT No.: PCT/SE2015/050441
§ 371 (c)(1),
(2) Date: Oct. 13, 2017

(87) PCT Pub. No.: WO2016/167695
PCT Pub. Date: Oct. 20, 2016

(65) Prior Publication Data
US 2018/0109397 A1  Apr. 19, 2018

(51) Int. Cl.
*H04L 12/413* (2006.01)
*H04L 5/16* (2006.01)
(Continued)

(52) U.S. Cl.
CPC .......... *H04L 12/413* (2013.01); *H04L 5/16* (2013.01); *H04L 27/0006* (2013.01); *H04W 74/0816* (2013.01); *H04L 5/0098* (2013.01)

(58) Field of Classification Search
CPC ..... H04L 12/413; H04L 5/16; H04L 27/0006; H04L 5/0098; H04W 74/0816
See application file for complete search history.

(56) References Cited

U.S. PATENT DOCUMENTS 5,490,175 A * 2/1996 Alameh ............... H04L 25/068
375/317
5,517,504 A   5/1996 Tran et al.
(Continued)

FOREIGN PATENT DOCUMENTS

WO    WO-2016041205 A1 * 3/2016 .......... H04B 7/0452

OTHER PUBLICATIONS

Kitayama, Ken-Ichi, "Carrier Sense Using Subcarrier-Multiplexed Signaling for Optical Frequency Division Multiple Access," Journal of Lightwave Technology, vol. 15, Issue 5, May 1997, IEEE, pp. 758-765.
(Continued)

*Primary Examiner* — Ian N Moore
*Assistant Examiner* — Rushil Parimal Sampat
(74) *Attorney, Agent, or Firm* — Withrow & Terranova, PLLC

(57) ABSTRACT

A first communication device and a method performed thereby are provided for communicating with at least a second communication device. The first and the second communication device are operable in a wireless communication network employing contention based access for radio resources comprising a plurality of frequency subcarriers, wherein at least the second communication device transmits a control sequence on at least one subcarrier of a predefined subcarrier pattern when transmitting data. The method comprises: demodulating the radio resources on at least a subset of subcarriers of the predefined subcarrier pattern; and determining whether the demodulated radio resources comprise the control sequence; that being the case: refraining from transmitting data to the second communication device; and otherwise: transmitting data to the second communication device.

9 Claims, 10 Drawing Sheets

(51) Int. Cl.
*H04L 27/00* (2006.01)
*H04W 74/08* (2009.01)
*H04L 5/00* (2006.01)

(56) References Cited

U.S. PATENT DOCUMENTS

| | | | |
|---|---|---|---|
| 8,125,972 B2* | 2/2012 | Agarwal | H04L 1/0026 370/281 |
| 8,804,495 B2* | 8/2014 | Amini | H04H 20/61 370/221 |
| 2016/0360520 A1* | 12/2016 | Pani | H04W 72/0413 |
| 2017/0195107 A1* | 7/2017 | Liu | H04B 7/0452 |
| 2017/0201359 A1* | 7/2017 | Li | H04W 72/0453 |

OTHER PUBLICATIONS

International Search Report and Written Opinion for International Patent Application No. PCT/SE2015/050441, dated Dec. 11, 2015, 11 pages.

* cited by examiner

CARRIER SENSE MULTIPLE ACCESS (CSMA) WITH FREQUENCY DIVISION MULTIPLEXING FOR DATA TRANSMISSION IN WIRELESS COMMUNICATION

This application is a 35 U.S.C. § 371 national phase filing of International Application No. PCT/SE2015/050441, filed Apr. 16, 2015, the disclosure of which is incorporated herein by reference in its entirety.

TECHNICAL FIELD

The present disclosure relates to wireless communication and in particular to a first communication device and a method performed thereby for communicating with a second communication device, wherein the first and the second communication device are operable in in a wireless communication network employing contention based access for radio resources comprising a plurality of frequency subcarriers.

BACKGROUND

Carrier Sense Multiple Access, CSMA is a multiple access scheme enabling access of multiple users to a common media without centralised coordination; the CSMA protocol provides distributed coordination.

A communication device that wants to access the medium senses if the medium is free for a certain period of time and if it is free the communication device starts to transmit. If the medium is determined to be busy the communication device refrains from transmitting. Typically sensing is done with an energy measurement across the channel bandwidth and over the time duration the medium must be free. CSMA can be extended with a Collision Avoidance, Calif., mechanism. One such mechanism is that if the medium has been determined to be busy the communication device does not immediately tries to access the medium again but randomly selects a backoff time and accesses the medium only after the backoff time has elapsed. CSMA together with CA is referred to as CSMA/CA.

CSMA/CA is used for the Distributed Coordination Function, DCF, (medium access protocol) in Wi-Fi. The medium needs to be free for the Inter Frame Spacing, IFS, before a communication device is allowed to transmit. Depending on the message the IFS has different lengths; to transmit a regular data frame the medium needs to be free for the Default Inter Frame Spacing, DIFS, while for an ACK/NACK the medium needs to be free for the Short Inter Frame Spacing, SIFS, which is shorter than DIFS. The shorter the time the medium needs to be free before a frame can be transmitted the higher the probability that the frame can be sent, i.e. priority access can be handled with shorter IFS.

CSMA (or CSMA/CA) may be used together with Time Division Multiplex, TDM, and Time Division Multiple Access, TDMA, where transmissions to (TDM) or from (TDMA) multiple communication devices use different resources in time.

In Frequency Division Multiplex, FDM, one node may simultaneously transmit to multiple nodes using different parts of channel spectrum. In Frequency Division Multiple Access, FDMA, multiple nodes transmit simultaneously to the same node using different parts of the channel spectrum. Orthogonal Frequency Division Multiplex, OFDM, and Orthogonal Frequency Division Multiple Access, OFDMA, are special cases of FDM and FDMA, respectively. FDM and FDMA enable better medium utilisation if single transmissions don't require the full channel bandwidth.

FIG. 1a is an illustration of FDM, where (A) a communication device, e.g. an access point (AP), transmits simultaneously to multiple communication devices (STA1, STA2, STA3) using FDM; and where (B) transmissions to different communication devices may be separated in frequency domain.

FIG. 1b is an illustration of FDM, where (A) multiple communication devices (STA1, STA2, STA3) simultaneously transmit to a communication device, e.g. an access point (AP), using FDMA; and where (B) transmissions from different communication devices may be separated in frequency domain.

TDM and TDMA may lead to low medium utilisation if a single transmission does not require the complete channel bandwidth. Due to the time division in TDM and TDMA, a communication device cannot transmit to/receive from multiple communication devices simultaneously leaving the medium underutilised. The problem may be solved by FDM and FDMA where one communication device may communicate with multiple communication devices simultaneously. Unfortunately FDMA and CSMA (in the following when CSMA is mentioned, both CSMA and CSMA/CA are intended) cannot be combined as described below.

The straight forward approach to combine FDMA with CSMA would be that a communication device only uses that portion of the channel spectrum that is determined to be free during sensing. Sensing needs to be done in this case frequency-selective, i.e. not wide-band across the complete channel bandwidth but narrow-band with a resolution matching the transmission granularity in frequency (e.g. per subcarrier or group of subcarriers in a multi-carrier system). FIG. 1c shows an example illustrating this. The Access Point (AP) transmits to Station 1 (STA1) using the lower part of the channel spectrum. STA2 senses the spectrum and determines that the lower part of the channel spectrum is busy but the higher part of the channel spectrum is free. STA2 therefore starts to transmit to AP using the free higher part of the channel spectrum. If AP is not full-duplex capable its reception from STA2—even if at a different frequency portion of the channel spectrum—drowns in its own transmission to STA1. Full-duplex capability is an emerging technology but is not yet commercially viable.

SUMMARY

The object is to obviate at least some of the problems outlined above. In particular, it is an object to provide a first communication device and a method performed thereby for communicating with at least a second communication device. These objects and others may be obtained by providing a first communication device and a method performed by a first communication device according to the independent claims attached below.

According to an aspect a method performed by a first communication device is provided for communicating with at least a second communication device. The first and the second communication device are operable in a wireless communication network employing contention based access for radio resources comprising a plurality of frequency subcarriers, wherein at least the second communication device transmits a control sequence on at least one subcarrier of a predefined subcarrier pattern when transmitting data. The method comprises demodulating the radio resources on at least a subset of subcarriers of the predefined subcarrier pattern; and determining whether the demodulated radio resources comprise the control sequence; that being the case: refraining from transmitting data to the second communication device; and otherwise: transmitting data to the second communication device.

According to an aspect, a first communication device is provided for communicating with at least a second communication device. The first and the second communication device are operable in a wireless communication network employing contention based access for radio resources comprising a plurality of frequency subcarriers, wherein at least the second communication device transmits a control sequence on at least one subcarrier of a predefined subcarrier pattern when transmitting data. The first communication device is configured for demodulating the radio resources on at least a subset of subcarriers of the predefined subcarrier pattern; and determining whether the demodulated radio resources comprise the control sequence; that being the case: refraining from transmitting data to the second communication device; and otherwise: transmitting data to the second communication device.

The first communication device and the method performed thereby have several possible advantages. One possible advantage is that it enables the combination of FDMA with CSMA and CSMA/CA without requiring full-duplex communication devices. Since FDMA may increase the medium utilisation over TDMA the method enables higher medium utilisation while at the same time using the simple CSMA (and CSMA/CA) medium access control mechanism.

BRIEF DESCRIPTION OF DRAWINGS

Embodiments will now be described in more detail in relation to the accompanying drawings, in which.

DETAILED DESCRIPTION

Briefly described, a first communication device and a method performed by the first communication device for communicating with at least a second communication device are provided. Transmissions from different communication devices should not start at an arbitrary position in frequency domain but only at certain positions, and/or transmissions from different communication devices should comprise a control sequence identifying that the respective communication device is currently transmitting. In this manner, a first communication device wanting to transmit to a second communication device may detect if the second communication device is currently transmitting or not, thereby avoiding transmitting to the second communication device if the second communication device is currently transmitting.

Embodiments herein relate to a method performed by a first communication device for communicating with at least a second communication device. Different exemplifying embodiments will now be described with reference to FIG. 2a.

Figure 1A:
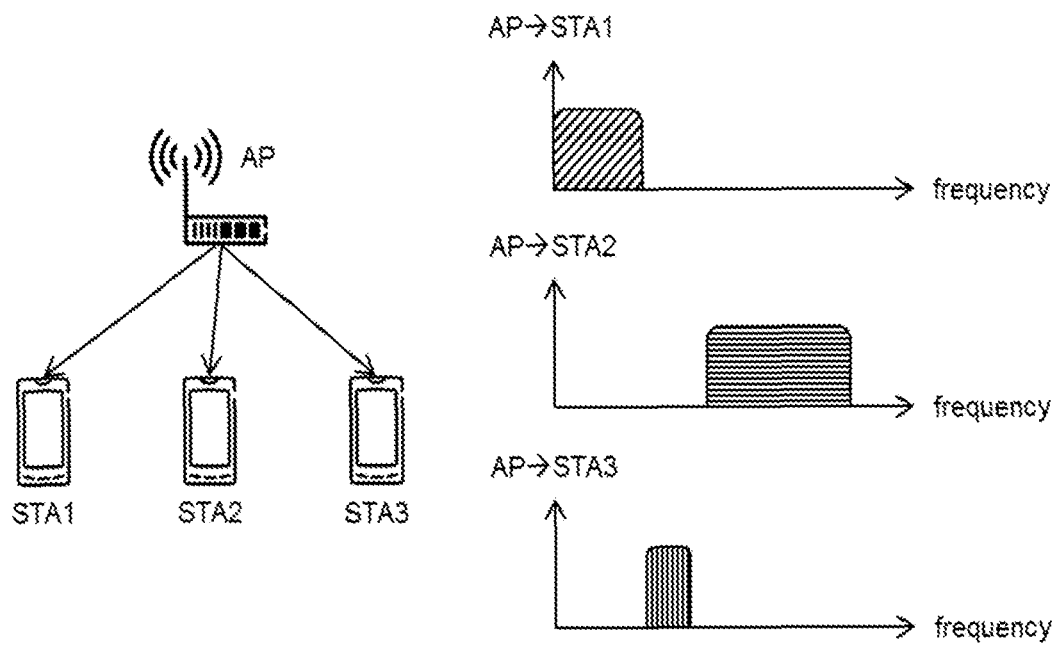
FIG. 1a is an illustration of FDM where a communication device, e.g. an access point (AP), transmits simultaneously to multiple communication devices (STA1, STA2, STA3) using FDM.
Figure 1B:
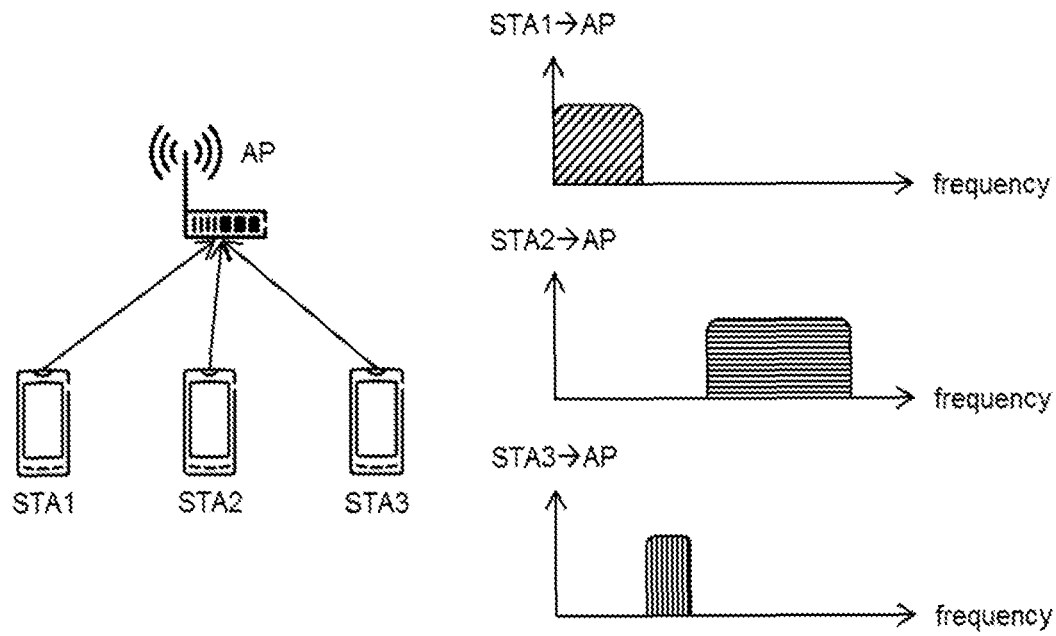
FIG. 1b is an illustration of FDMA where multiple communication devices (STA1, STA2, STA3) simultaneously transmit to a communication device, e.g. an access point (AP), using FDMA.
Figure 1C:
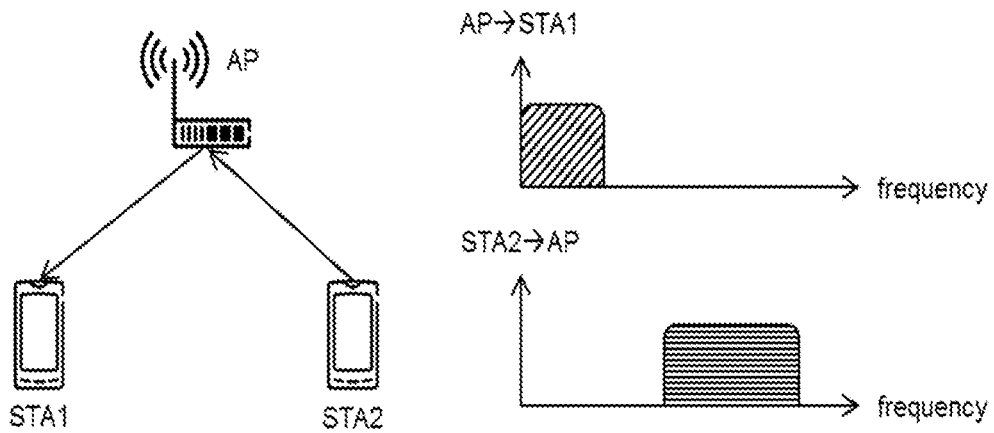
FIG. 1c is an illustration of a combination of FDM/FDMA and CSMA, which does not work unless the communication devices are full-duplex capable.
Figure 2A:
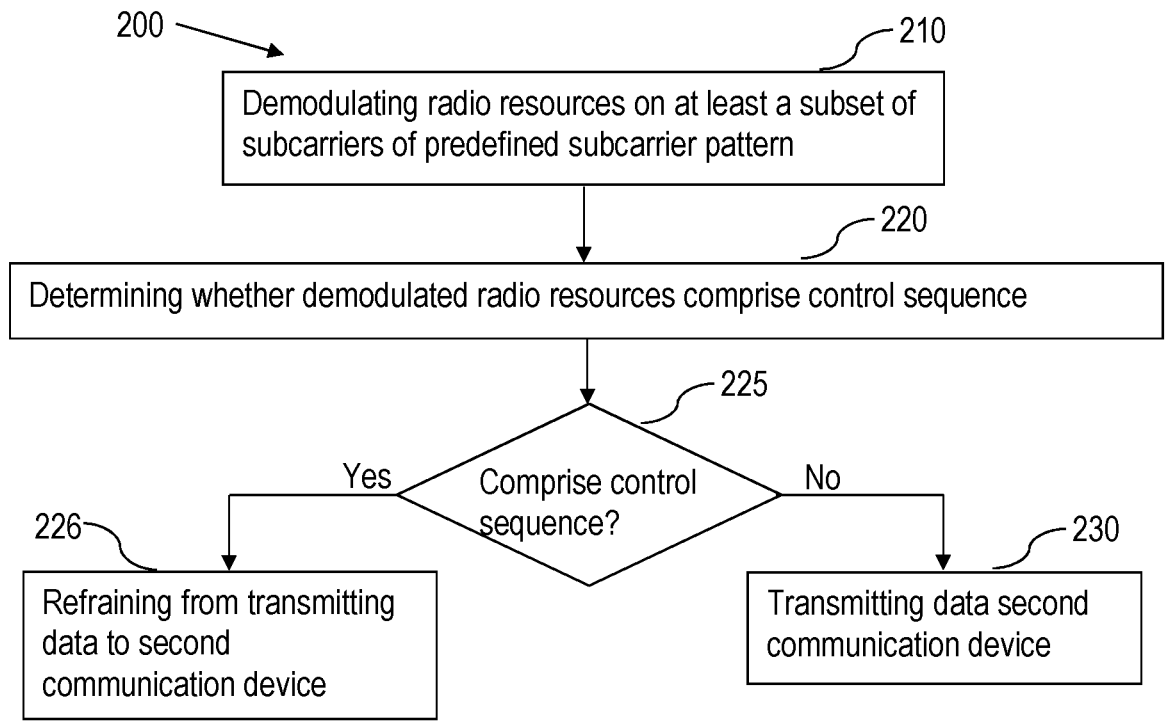
FIG. 2a is a flowchart of a method performed by a first communication device for communicating with at least a second communication device, according to an exemplifying embodiment.

The first and the second communication device are operable in a wireless communication network employing contention based access for radio resources comprising a plurality of frequency subcarriers, wherein at least the second communication device transmits a control sequence on at least one subcarrier of a predefined subcarrier pattern when transmitting data. FIG. 2a illustrates the method comprising: demodulating 210 the radio resources on at least a subset of subcarriers of the predefined subcarrier pattern; and determining 220 whether the demodulated radio resources comprise the control sequence; that being the case: refraining 226 from transmitting data to the second communication device; and otherwise: transmitting data 230 to the second communication device.

Before the first communication device is allowed to transmit to the second communication device, the first communication device must ascertain that the second communication device is not currently transmitting. As explained above, the second communication device may not receive any transmission properly if it is currently transmitting itself.

The first communication device may sense the medium, i.e. the radio resources. When the first communication device senses the medium, the first communication device may receive signals that are being transmitted on radio resources of the medium. The first communication device thus demodulates the possibly received radio resources on at least a subset of subcarriers of the predefined subcarrier pattern. If the second communication device is currently transmitting, the second communication device also transmits the control sequence on at least one subcarrier of a predefined subcarrier pattern. As will be explained in more detail below, the control sequence may comprise only one "0" or a sequence of "0" as well as only one "1", a sequence of "1" or a combination of "0" and "1". In this disclosure, when it comes to transmitting a control sequence, transmitting a "1" on a subcarrier corresponds to that subcarrier being used for transmission and transmitting a "0" on a subcarrier corresponds to that subcarrier being left unused, i.e. not used for transmission.

The predefined subcarrier pattern may be defined across the whole bandwidth but second communication device may be using only a fraction of whole bandwidth. The first communication device may only sense for the predefined subcarrier pattern within the used bandwidth. If the predefined subcarrier pattern is defined in a way that the first communication device may uniquely determine if the second communication device is transmitting or not even from the limited observation within the used bandwidth, then the first communication device may demodulate the possibly received radio resources on at least a subset of subcarriers of the predefined subcarrier pattern.

Once the first communication device has demodulated the radio resources, it may determine if the demodulated radio resources comprise the control sequence. If the demodulated radio resources comprise the control sequence, it means that the second communication device is currently transmitting so that the first communication device refrains from transmitting data to the second communication device, illustrated by box 226 of FIG. 2a.

However, if the demodulated radio resources do not comprise the control sequence, it means that the second communication device is currently not transmitting so that the first communication device may transmit data to the second communication device, as illustrated by box 230 of FIG. 2a.

The method performed by the first communication device may have several possible advantages. One possible advantage is that it enables the combination of FDMA with CSMA and CSMA/CA without requiring full-duplex communication devices. Since FDMA may increase the medium utilisation over TDMA the method enables higher medium utilisation while at the same time using the simple CSMA (and CSMA/CA) medium access control mechanism.

In an example, transmitting data 230 further comprises transmitting a control sequence on a predefined subcarrier pattern.

As described above, before the first communication device may transmit data, it must first ascertain that the second communication device is not currently transmitting data to another communication device. If the first communication device does not detect the control sequence of the second communication device, the first communication device may transmit data to the second communication device. When the first communication device transmits data to the second communication device, also the first communication device transmits a control sequence in a predefined subcarrier pattern.

The predefined subcarrier pattern and/or control sequence of the first communication device may be different from the predefined subcarrier pattern and/or control sequence of the second communication device. In this manner, any other communication device (for example a third communication device) wanting to transmit specifically to the first or the second communication device may listen for the control sequence of the first or the second communication device, and if the third communication device may ascertain that the first or the second communication device is currently not transmitting, the third communication device can transmit data to the first or the second communication device.

In an example, wherein the first communication device is a user terminal, wherein also the user terminal transmits a control sequence in a at least one subcarrier of a predefined subcarrier pattern, wherein (a) the predefined subcarrier pattern and/or control sequence of the first communication device is unique to the first communication device within the wireless communication network and thus different from any predefined subcarrier pattern and/or control sequence of other user terminals in the wireless communication network, or (b) the predefined subcarrier pattern and/or control sequence of the first communication device is the same as the predefined subcarrier pattern and/or control sequence of other user terminals within the wireless communication network; and wherein the predefined subcarrier pattern and/or control sequence pattern of the first communication device being a user terminal is different from the predefined subcarrier pattern and/or control sequence of any access point within the wireless communication network.

In this example, (a) each communication device may have its own unique predefined subcarrier pattern and/or control sequence within at least a part of the wireless communication network. This means that each communication device may be uniquely identified by its predefined subcarrier pattern and/or control sequence, within at least a part of the wireless communication network. Alternatively, (b) user terminals may all have the same predefined subcarrier pattern and/or control sequence, wherein there is a differentiation between communication devices being user terminals and communication device being access points, APs.

In another example, wherein the first communication device may also communicate with a third communication device, wherein the third communication device also transmits a control sequence in a at least one subcarrier of a predefined subcarrier pattern, wherein the predefined subcarrier pattern and/or control sequence of the second communication device is different from the predefined subcarrier pattern and/or control sequence of the third communication device, wherein the first communication device is to transmit data to one of the second and the third communication device, the method comprises demodulating the radio resources on at least a subset of subcarriers of the predefined subcarrier pattern of the second and/or the third communication device, determining if the second and/or third communication device is currently transmitting, and when at least one of the second and the third communication device is not transmitting: the method comprises transmitting data to one of the second and the third communication device that is not transmitting using subcarriers available to the first communication device.

In this example, the first communication device is enabled to communicate with for example two different APs. Thus, when the first communication device wants to transmit data, it may sense the medium and demodulate received radio resources on at least a subset of subcarriers of the respective predefined subcarrier pattern. If the demodulated radio resources comprise both the control sequence of the second and the third communication device, the first communication device must refrain from transmitting data to any of the second and the third communication device. However, if the demodulated resources do only comprise one of the respective control sequences, the first communication device may transmit data to the communication device, which control sequence is not comprised in the demodulated resources. If none of the control sequences is comprised in the radio resources, the first communication device may transmit to any of the second or the third communication device.

In an example, the starting subcarrier out of all subcarriers comprised in the predefined subcarrier pattern of the second communication device is an odd numbered subcarrier.

This is an example of a predefined subcarrier pattern. Generally, subcarriers are numbered 1 to N or 0 to N−1, N being the number of subcarriers in a transmission, of a bandwidth or of a subcarrier group, or in a system bandwidth, wherein the predefined subcarrier pattern of the second wireless device comprises the starting subcarrier out of all subcarriers used by the second wireless device being an odd numbered subcarrier.

In another example, the starting subcarrier out of all subcarriers comprised in the predefined subcarrier pattern of the second communication device is an even numbered subcarrier.

This is an alternative example to the one above. In this example, the predefined subcarrier pattern of the second wireless device comprises the starting subcarrier out of all subcarriers used by the second wireless device being an even numbered subcarrier.

The control sequence may be (a) an all "0" sequence, (b) and all "1" sequence, or (c) a sequence of arbitrary elements.

The control sequence identifies the communication device that transmits it, when transmitting data. In the simplest from, the control sequence is just a "0" meaning that a subcarrier is left unused as will be described in more detail below. Alternatively, the control sequence is just a "1" meaning that a subcarrier is used as will also be described in more detail below. The control sequence may alternatively be at least two subcarriers long, wherein the control sequence may be a combination of at least two elements being "0" or "1" in any combination.

Transmissions from different communication devices should not start at an arbitrary position in frequency domain but only at certain positions, and/or transmissions from different communication devices should comprise a control sequence identifying that the respective communication device is currently transmitting.

In an example, for a first group of communication devices transmissions may only start at even subcarriers and for a second group of communication devices only at odd subcarriers in a multi-carrier system.

A first communication device that wants to transmit to a second communication device senses the medium and based on the sensing result, it may determine a predefined subcarrier pattern and if the control sequence identifying the second communication device is transmitted on the subcarriers of the predefined subcarrier pattern. If the second communication device is currently transmitting, the first communication device does not transmit, otherwise it does.

Figure 2B:
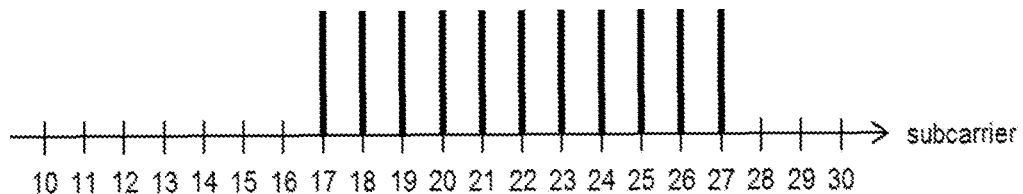
FIG. 2b is an illustration of a transmission from a communication device, where the transmission starts at an odd subcarrier.
Figure 2C:
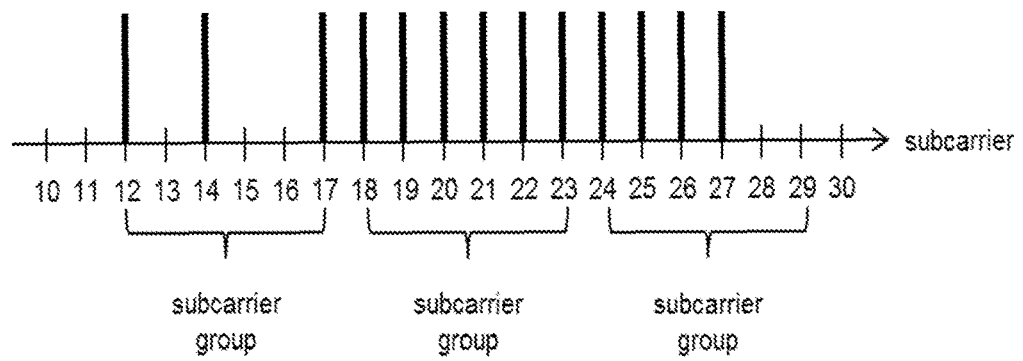
FIG. 2c is an illustration of a transmission, wherein in the first subcarrier group, not all subcarriers are used, but only subcarriers according to a certain pattern.

For transmissions from the second communication device, e.g. being an AP as illustrated in FIG. 2b, certain subcarriers should fulfil a certain criteria. In the simplest case transmissions from an AP may only start at e.g. odd (even would work as well) subcarriers (i.e. first subcarrier or the predefined subcarrier pattern is even and modulated by 0). The same of course works with the last subcarrier meaning that the last subcarrier should be odd or even respectively. Other—more complicated—criteria are exemplified above as well. One example would be were subcarriers are grouped into subcarrier groups (e.g. resource blocks in Long Term Evolution, LTE) and AP transmissions are allowed to use a subset of subcarriers within their first subcarrier group. FIG. 2b shows an example of the simple "odd subcarrier" criteria and FIG. 2c illustrates an example of more complex "subcarrier group" criteria.

In FIG. 2b, the transmission from an AP starts at an odd subcarrier. In FIG. 2c, in the first used subcarrier group not all subcarriers are used but only subcarriers according to a certain pattern. In the example only subcarriers 0, 2, and 5 of the first subcarrier group may be used, in this example a subcarrier group contains 6 subcarriers.

In an example, transmissions from e.g. first communication device being a STA may start only at even subcarriers (matching the odd subcarrier criteria of the second communication device being an AP) or if subcarrier groups are used a different set of subcarriers must be used in a first subcarrier group. Also the even/odd criteria may be formulated within the framework of subcarrier groups: transmissions using an odd start subcarrier may only use subcarriers 1 to $N_{RB}$-1 (assuming subcarrier groups of size $N_{RB}$) while transmissions using an even start subcarrier can use all subcarriers (assuming even $N_{RB}$ and that subcarrier groups start at even subcarriers). Note that restricting the start subcarrier (or the first subcarrier group to use only a subset of subcarriers) reduces capacity only minimally since it only restricts the starting subcarrier (or first subcarrier group), it does not limit usage of subsequent subcarriers or subcarrier groups.

Figure 2D:
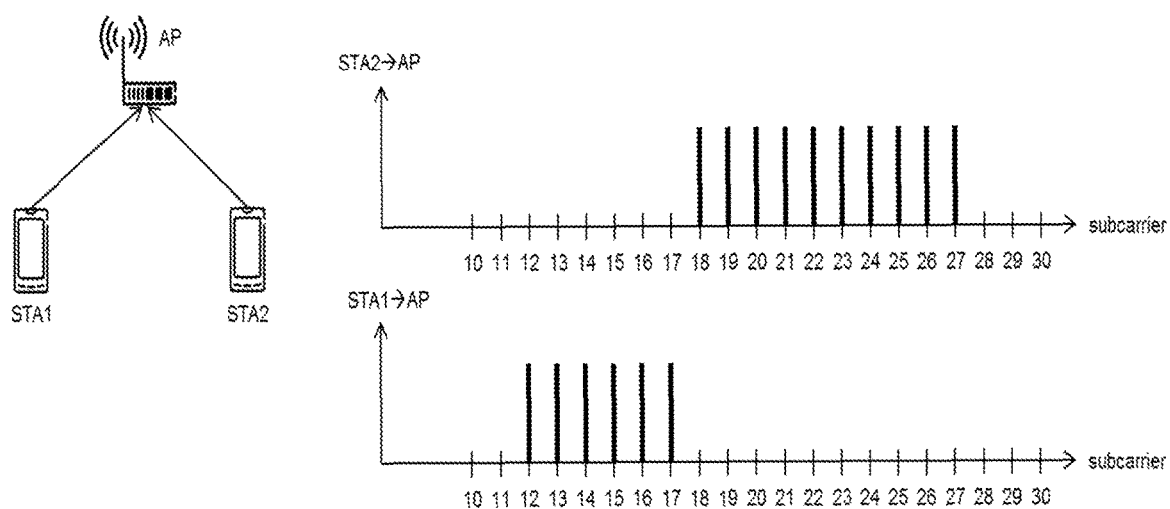
FIG. 2d is an illustration of two communication devices, STA1 and STA2, transmitting to another communication device, AP, with a respective even start subcarrier.
Figure 2E:
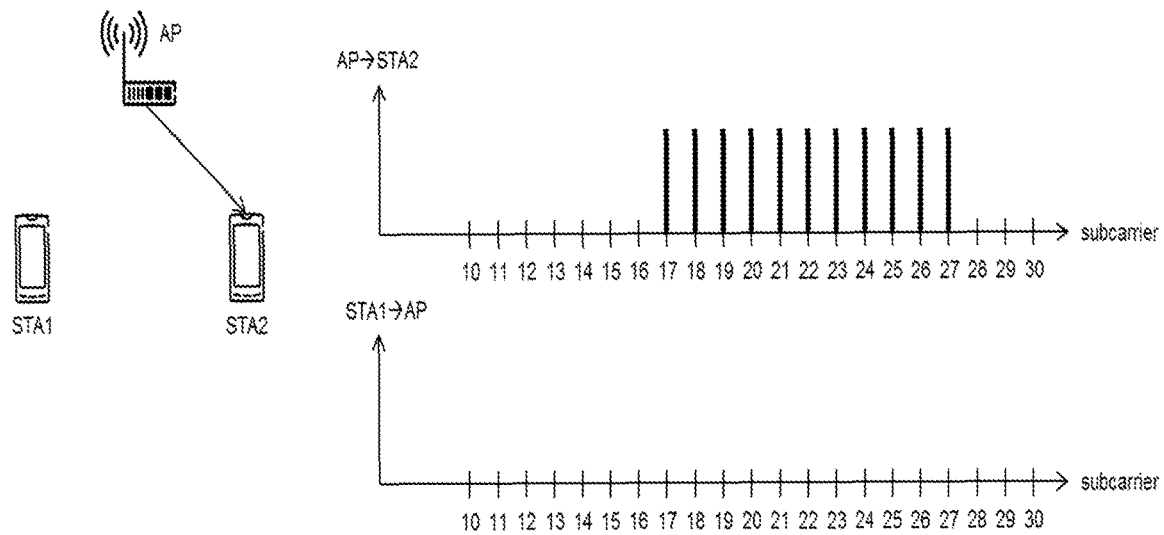
FIG. 2e is an illustration of a communication device, STA1, wanting to transmit to another communication device, AP, but where the transmission is not allowed due to the AP currently transmitting.

If a first communication device being a STA wants to transmit to the second communication device being an AP it may sense the media (with subcarrier resolution). If the medium is free the STA transmits. Even if the medium is not free but all sensed transmissions start at even subcarriers (i.e. no transmission starts at an odd subcarrier) the first communication device may conclude that no transmissions originate from the AP and the AP may receive. The STA begins to transmits at a free channel spectrum using an even start subcarrier. FIGS. 2d and 2e show two examples: in FIG. 2d the AP does not transmit and the STA1 may transmit; in FIG. 2e the AP already transmits and the STA1 should not transmit. In FIG. 2d STA2 transmits to the AP with an even start subcarrier. STA1 senses the transmissions but also senses that it starts at an even subcarrier. STA1 concludes that the other transmission is from a STA and transmits. In FIG. 2e the AP transmits with an odd start subcarrier. STA1 senses this transmission and also senses that it starts at an odd subcarrier. STA1 concludes that the transmission is from the AP and refrains from transmitting.

Figure 2F:
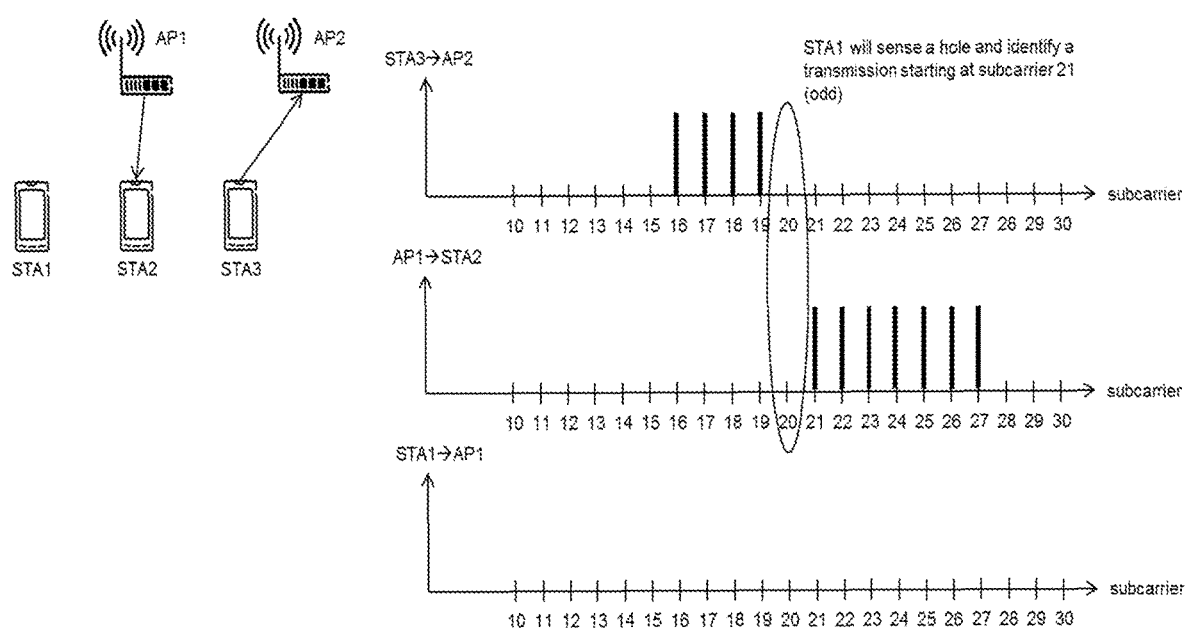
FIG. 2f is an illustration of an example of communication between a plurality of communication devices, two APs: AP1 and AP2, and three other communication devices: STA1, STA2 and STA3.

FIG. 2f demonstrates that this solution also works in a network consisting of multiple APs each serving their own set of STAs. STA3 transmits to AP2 on subcarriers 16 to 19. AP1 serves STA2 on subcarriers 21 to 27. STA1 wants to transmit to AP1 and senses the medium and senses the hole at subcarrier 20. Therefore STA1 may determine that there are multiple transmissions with one of them starting at subcarrier 21, i.e. an odd subcarrier. STA1 may conclude that an AP transmits and refrains from transmission. Here it is assumed that all transmissions end at odd subcarriers, this could be fulfilled by subcarrier groups with an even number of subcarriers and subcarrier groups starting at even subcarriers. It shall be pointed out that the STA may further demodulate the radio resources that it received during sensing the medium and determining whether to transmit or not based on whether the control sequence of the AP is comprised in the demodulated the radio resources.

Figure 2G:
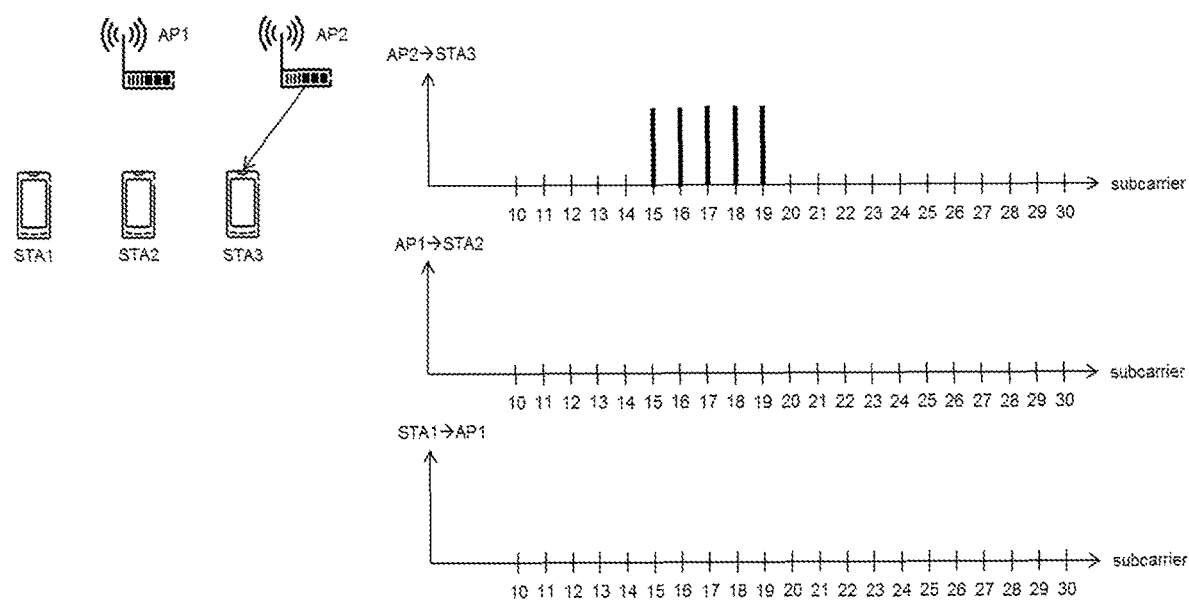
FIG. 2g is yet another exemplifying illustration of communication between a plurality of communication devices, two APs: AP1 and AP2, and three other communication devices: STA1, STA2 and STA3.

If in above example AP2 would transmit to STA3 and AP1 would not transmit at all there would be no reason for STA1 not to access AP1, see FIG. 2g. However, STA1 senses AP2's transmission starting at an odd subcarrier and concludes that this is an AP transmission and refrains from transmitting since STA1 has no means to distinguish between AN1 and AN2 in this example where the predefined subcarrier pattern or the control sequence for AN1 and AN2 are the same. It shall be pointed out that this is merely an example and as has been described above, communication devices may have a respective predefined subcarrier pattern and a control sequence that are unique to the respective communication devices.

In FIG. 2g, AP2 transmits to STA3 using subcarriers 15 to 19. AP1 does not transmit at all. STA1 senses a transmission starting at an odd subcarrier (subcarrier 15) and refrains from transmitting to AP1, even though AP1 is not transmitting in this example.

Figure 2H:
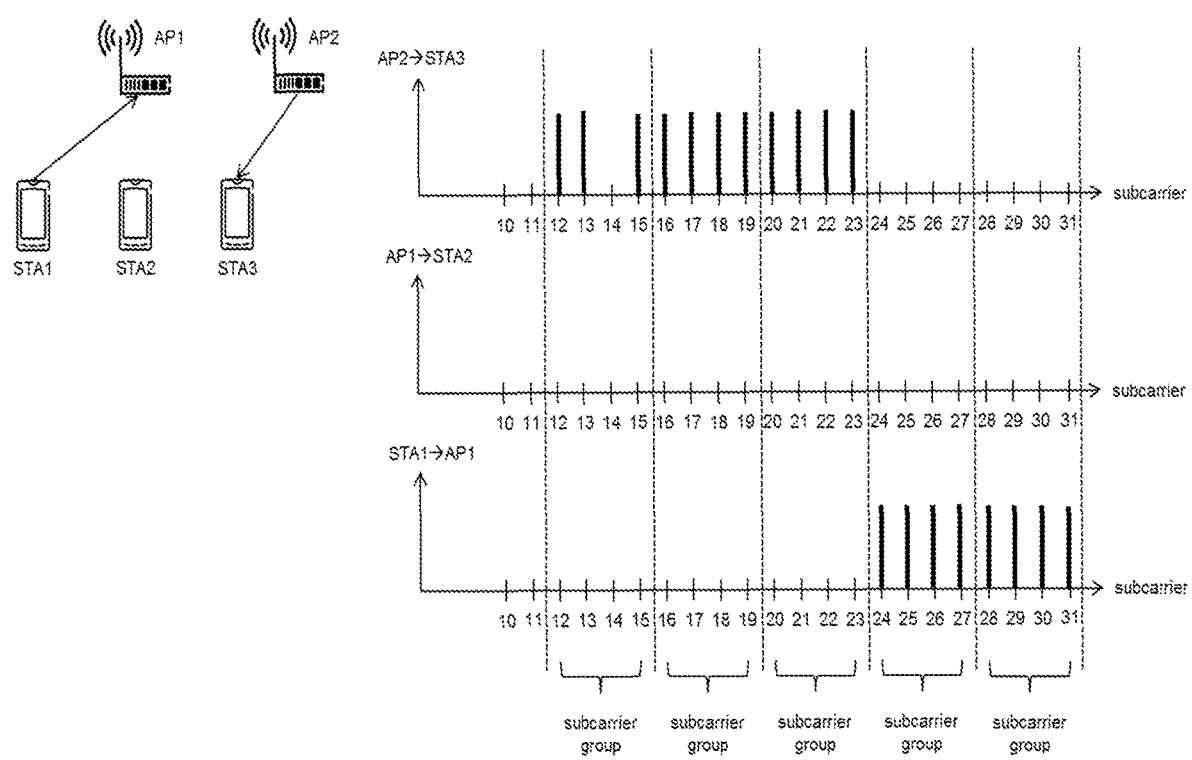
FIG. 2h is still another exemplifying illustration of communication between a plurality of communication devices, two APs: AP1 and AP2, and three other communication devices: STA1, STA2 and STA3.
Figure 2I:
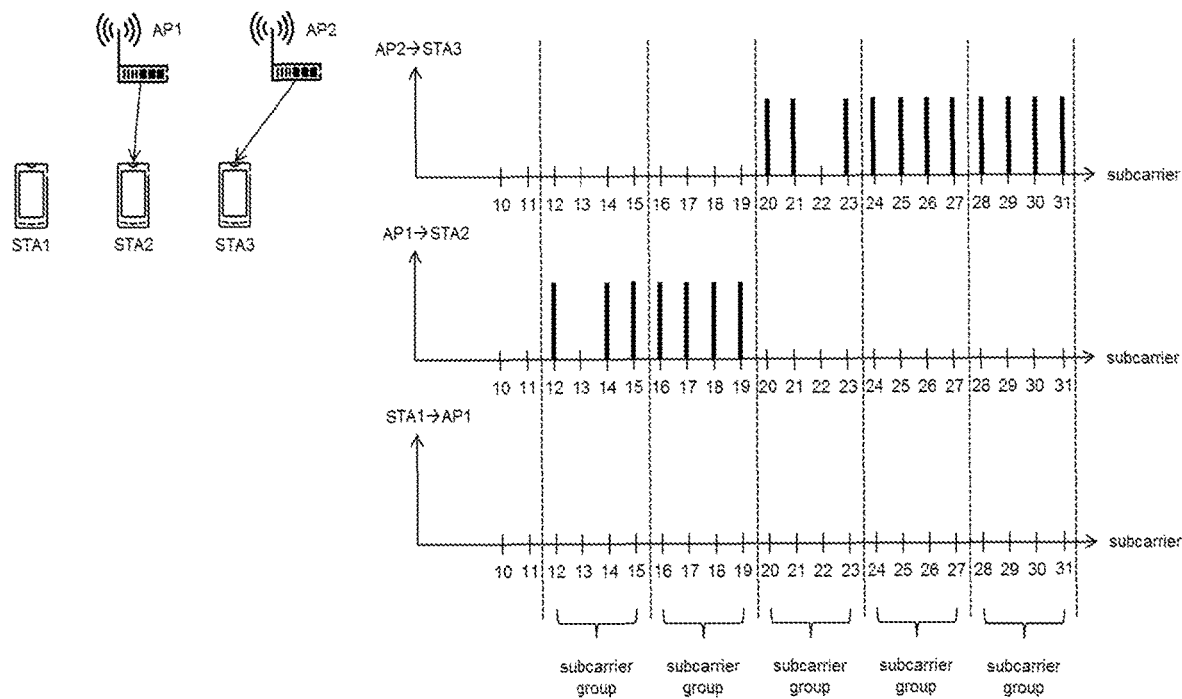
FIG. 2i is a further exemplifying illustration of communication between a plurality of communication devices, two APs: AP1 and AP2, and three other communication devices: STA1, STA2 and STA3.

As described above, different communication devices may have different predefined subcarrier patterns as well as different control sequences. Assume the subcarrier groups are of size $N_{RB}=4$. AP1, AP2, and STAs all use different subcarrier patterns in some of their used subcarrier groups. In the following example it is assumed that the subcarrier pattern is used in the first used subcarrier group. A simple example is that STAs are allowed to use all subcarrier in the first subcarrier group while AP1 and AP2 may not use the second and third subcarriers in the first used subcarrier group, respectively. FIG. 2h shows the same example as FIG. 2g with AP2 transmitting to STA3 while AP1 does not transmit. AP2 does not use subcarrier 14 (third subcarrier of subcarrier group 12 to 15) in its first used subcarrier group and all subcarriers of the other used subcarrier groups. STA1 senses this transmissions but concludes that this transmission does not originate from AP1 which would not use the second subcarrier in its first subcarrier group (which would be subcarrier 13 of the subcarrier group 12 to 15) and transmits on unused subcarrier groups to AP1. FIG. 2i shows the same setup but now AP1 and AP2 transmit to STA2 and STA3, respectively. STA1 senses a subcarrier group where the second subcarrier is not used and a subcarrier group where the third subcarrier is not used. The subcarrier group with unused second subcarrier indicates to STA1 that AP1 transmits and it refrains from transmitting to AP1. In FIG. 2i, AP2 transmits to STA3 not using subcarrier 22 (third subcarrier in subcarrier group) in its first subcarrier group together with all subcarriers in the other used subcarrier groups. AP1 transmits to STA2 not using subcarrier 13 (second subcarrier in subcarrier group) in its first subcarrier group together with all subcarriers in the other used subcarrier groups. STA1 senses a transmission not using the second subcarrier of a subcarrier group and concludes this transmission is from AP1. STA1 refrains to transmit to AP1.

Figure 2J:
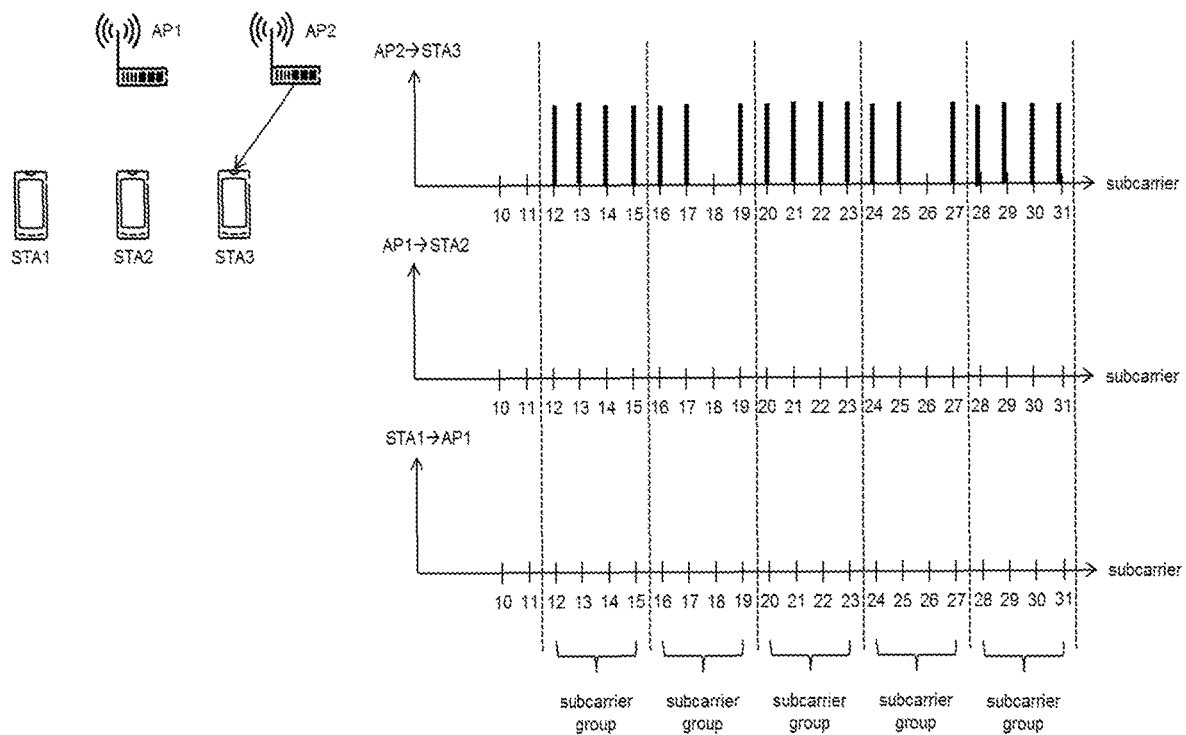
FIG. 2j is an illustration of yet an example of communication between a plurality of communication devices, two APs: AP1 and AP2, and three other communication devices: STA1, STA2 and STA3.

In the previous examples above, the subcarrier group with the special subcarrier pattern was the first one. In general, this special subcarrier pattern must not occur in the first used subcarrier group, it may be in another subcarrier group as well. It is even possible that multiple subcarrier groups use a special subcarrier pattern. The subcarrier patterns could be the same or different, as long as each subcarrier pattern uniquely identifies a communication device. Transmitting a special subcarrier pattern multiple times could provide robustness against fading. FIG. 2j shows an example where the same subcarrier pattern (third subcarrier in a subcarrier group is not used) is transmitted several times in the transmission from AP2 to STA3. Two subcarrier groups in a transmission from AP2 use the special subcarrier pattern (third subcarrier of a subcarrier group is not used).

Figure 2K:
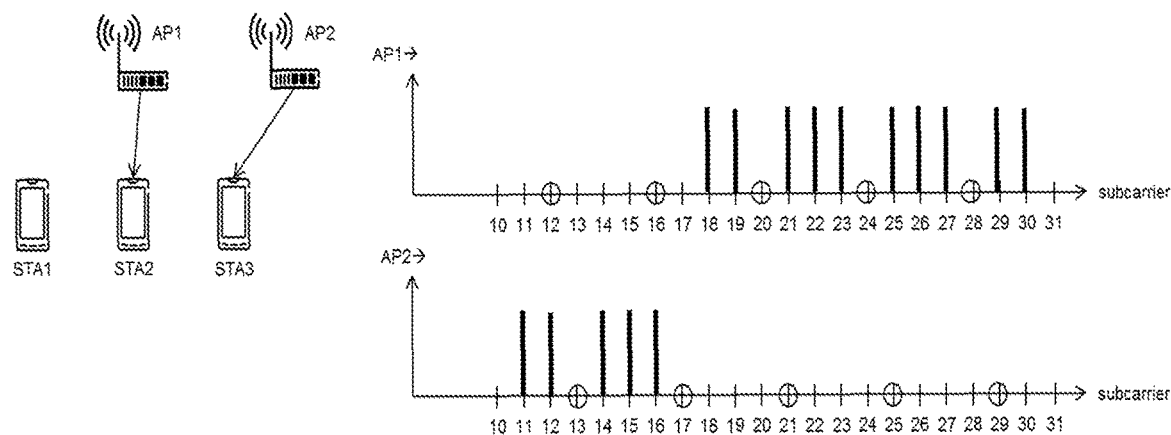
FIG. 2k is an illustration of yet an example still communication between a plurality of communication devices, two APs: AP1 and AP2, and three other communication devices: STA1, STA2 and STA3.

So far subcarrier pattern have been expressed in terms of subcarrier groups or simple even/odd pattern. More generally, different subcarrier patterns spanning the complete channel bandwidth could be defined. Each node gets a subcarrier pattern assigned and the subcarriers of the pattern overlapping with the spectrum used for transmission are not used. The subcarrier pattern could be regular pattern or irregular pattern. A simple example of a regular pattern is that a node is not allowed to use every M-th subcarrier with different shifts to identify different nodes, i.e. pattern k could be defined as:

$$p_k = \{sc \in [0 \ldots N-1]: \mathrm{mod}(sc+k,M)=0\},$$

with sc denoting the subcarriers in the set, N the number of subcarriers in the complete channel bandwidth, and k the shift parameter distinguishing the different sets. FIG. 2k shows an example with M=4 and AP1 and AP2 using pattern $p_0$ and $p_3$, respectively. AP1 and PA2 use pattern $p_0$ and $p_3$, respectively. The "⊕" marked subcarriers are those ones which are not allowed to be used by an AP.

Figure 2L:
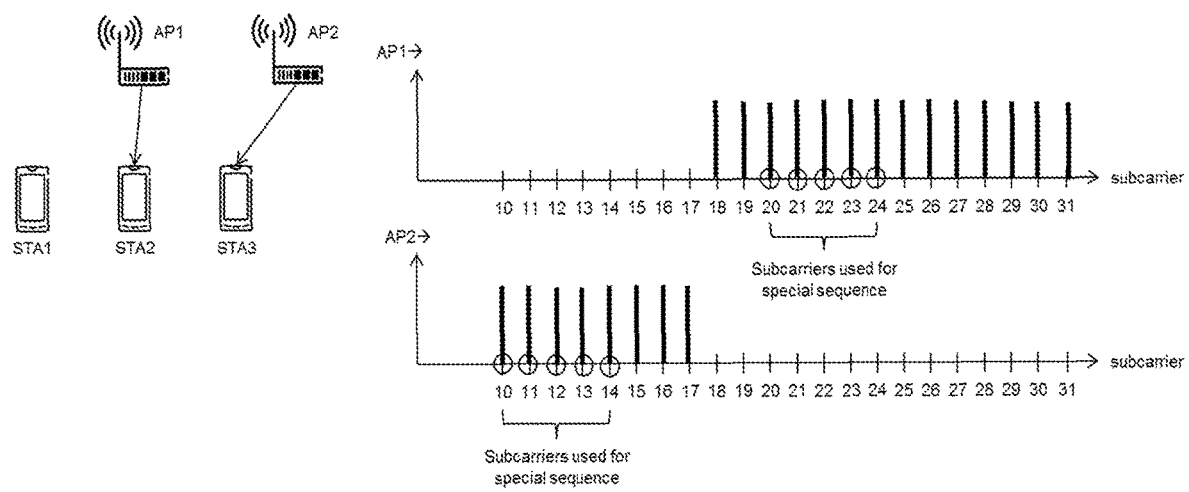
FIG. 2l is an illustration of yet a further example of communication between a plurality of communication devices, two APs: AP1 and AP2, and three other communication devices: STA1, STA2 and STA3.

FIG. 2l shows an example where AP1 and AP2 transmit special sequences on some of the used subcarriers. Even though in FIG. 2l the special sequence is only transmitted once within a transmission, the special sequence could be transmitted multiple times within the used subcarriers. Furthermore FIG. 2l shows that the subcarriers used for transmission of the special sequence are contiguous. This is only for simplicity, more generally they don't have to be contiguous. For example, irregular or regular subcarrier pattern (e.g. the modulo pattern) may be used to transmit the special sequence. A special sequence may be a sequence that has good cross correlation properties, i.e. if a special sequence is correlated with another special sequence the output should be very small or zero. Examples of sequences with good correlation properties are Zadoff-Chu sequences and Golay codes. In FIG. 2l, AP1 and AP2 use special sequences to mark their transmissions. The "⊕" marked subcarriers are those ones used to transmit the special sequence.

The assignment of even/odd pattern, special subcarrier pattern, special sequence to nodes and informing other communication devices of the assignments may need to be done prior the methods described so far herein may be applied. This could be done via signalling (both the assigning and informing), it could be fixed in the standard (e.g. depending on class of communication device (AN, STA) different patterns may be assigned), the information could be obtained via information in the SIM card, the information could be obtained during installation of those communication devices acting as APs.

Embodiments herein also relate to a first communication device for communicating with at least a second communication device. The first communication device has the same technical features, objects and advantages as the method performed thereby and will only be described in brief in order to avoid unnecessary repetition.

The first communication device will be described with reference to FIGS. 3 and 4.

The first and the second communication device are operable in in a wireless communication network employing contention based access for radio resources comprising a plurality of frequency subcarriers, wherein at least the second communication device transmits a control sequence on at least one subcarrier of a predefined subcarrier pattern when transmitting data. FIGS. 3 and 4 illustrate the first communication device 300, 400 being configured for demodulating the radio resources on at least a subset of subcarriers of the predefined subcarrier pattern; and determining whether the demodulated radio resources comprises the control sequence; that being the case: refraining from transmitting data to the second communication device; and otherwise: transmitting data to the second communication device.

The first communication device 300, 400 may be realised or implemented in various different ways. A first exemplifying implementation or realisation is illustrated in FIG. 3. FIG. 3 illustrates the first communication device 300 comprising a processor 321 and memory 322, the memory comprising instructions, e.g. by means of a computer program 323, which when executed by the processor 321 causes the first communication device 300 to demodulate the radio resources on at least a subset of subcarriers of the predefined subcarrier pattern; and to determine whether the demodulated radio resources comprises the control sequence; that being the case: the memory comprises instructions, which when executed by the processor 321 causes the first communication device 300 to refrain from transmitting data to the second communication device; and otherwise: to transmit data to the second communication device.

Figure 3:
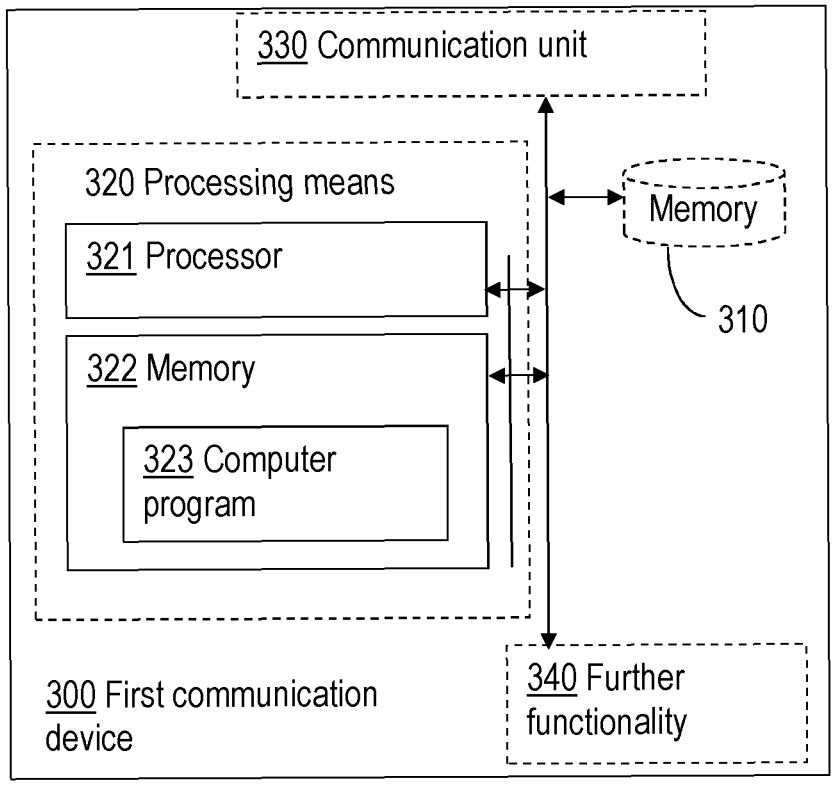
FIG. 3 is a block diagram of a first communication device for communicating with at least a second communication device, according to an exemplifying embodiment.

FIG. 3 also illustrates the first communication device 300 comprising a memory 310. It shall be pointed out that FIG. 3 is merely an exemplifying illustration and memory 310 may be optional, be a part of the memory 322 or be a further memory of the first communication device 300. The memory may for example comprise information relating to the first communication device 300, to statistics of operation of the first communication device 300, just to give a couple of illustrating examples. FIG. 3 further illustrates the first communication device 300 comprising processing means 320, which comprises the memory 322 and the processor 321. Still further, FIG. 3 illustrates the first communication device 300 comprising a communication unit 330. The communication unit 330 may comprise an interface through which the first communication device 300 communicates with other nodes or entities of the communication network as well as other communication units. FIG. 3 also illustrates the first communication device 300 comprising further functionality 340. The further functionality 340 may comprise hardware of software necessary for the first communication device 300 to perform different tasks that are not disclosed herein.

Figure 4:
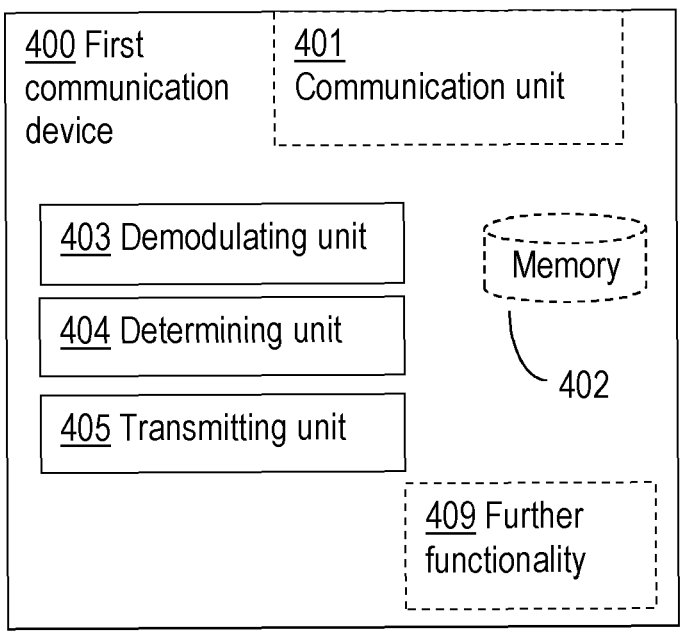
FIG. 4 is a block diagram of a first communication device for communicating with at least a second communication device, according to another exemplifying embodiment.

An alternative exemplifying implementation of the first communication device 300, 400 is illustrated in FIG. 4. FIG. 4 illustrates the first communication device 400 comprising a demodulating unit 403 for demodulating the radio resources on at least a subset of subcarriers of the predefined subcarrier pattern. The first communication device 400 further comprises a determining unit 404 for determining whether the demodulated radio resources comprise the control sequence. If the demodulated radio resources comprise the control sequence, the first communication device 400 is configured to refrain from transmitting data to the second communication device. The first communication device 400 further comprises a transmitting unit 405 for transmitting data to the second communication device when demodulated radio resources do not comprise the control sequence.

In FIG. 4, the first communication device 400 is also illustrated comprising a communication unit 401. Through this unit, the first communication device 400 is adapted to communicate with other nodes and/or entities in the wireless communication network. The communication unit 401 may comprise more than one receiving arrangement. For example, the communication unit 401 may be connected to both a wire and an antenna, by means of which the first communication device 400 is enabled to communicate with other nodes and/or entities in the wireless communication network. Similarly, the communication unit 401 may comprise more than one transmitting arrangement, which in turn is connected to both a wire and an antenna, by means of which the first communication device 400 is enabled to communicate with other nodes and/or entities in the wireless communication network. The first communication device 400 further comprises a memory 402 for storing data. Further, the first communication device 400 may comprise a control or processing unit (not shown) which in turn is connected to the different units 403-405. It shall be pointed out that this is merely an illustrative example and the first communication device 400 may comprise more, less or other units or modules which execute the functions of the first communication device 400 in the same manner as the units illustrated in FIG. 4.

It should be noted that FIG. 4 merely illustrates various functional units in the first communication device 400 in a logical sense. The functions in practice may be implemented using any suitable software and hardware means/circuits etc. Thus, the embodiments are generally not limited to the shown structures of the first communication device 400 and the functional units. Hence, the previously described exemplary embodiments may be realised in many ways. For example, one embodiment includes a computer-readable medium having instructions stored thereon that are executable by the control or processing unit for executing the method steps in the first communication device 400. The instructions executable by the computing system and stored on the computer-readable medium perform the method steps of the first communication device 400 as set forth in the claims.

The first communication device 300, 400 has the same possible advantages as the method performed by the first communication device. One possible advantage is that it enables the combination of FDMA with CSMA and CSMA/CA without requiring full-duplex communication devices. Since FDMA may increase the medium utilisation over TDMA the method enables higher medium utilisation while at the same time using the simple CSMA (and CSMA/CA) medium access control mechanism.

According to an embodiment, the first communication device 300, 400 further is configured for when transmitting data: transmitting a control sequence on a predefined subcarrier pattern.

According to yet an embodiment, the starting subcarrier out of all subcarriers comprised in the predefined subcarrier pattern of the second communication device is an odd numbered subcarrier.

According to another embodiment, the starting subcarrier out of all subcarriers comprised in the predefined subcarrier pattern of the second communication device is an even numbered subcarrier.

According to still an embodiment, the control sequence is (a) an all "0" sequence, (b) and all "1" sequence, or (c) a sequence of arbitrary elements.

Figure 5:
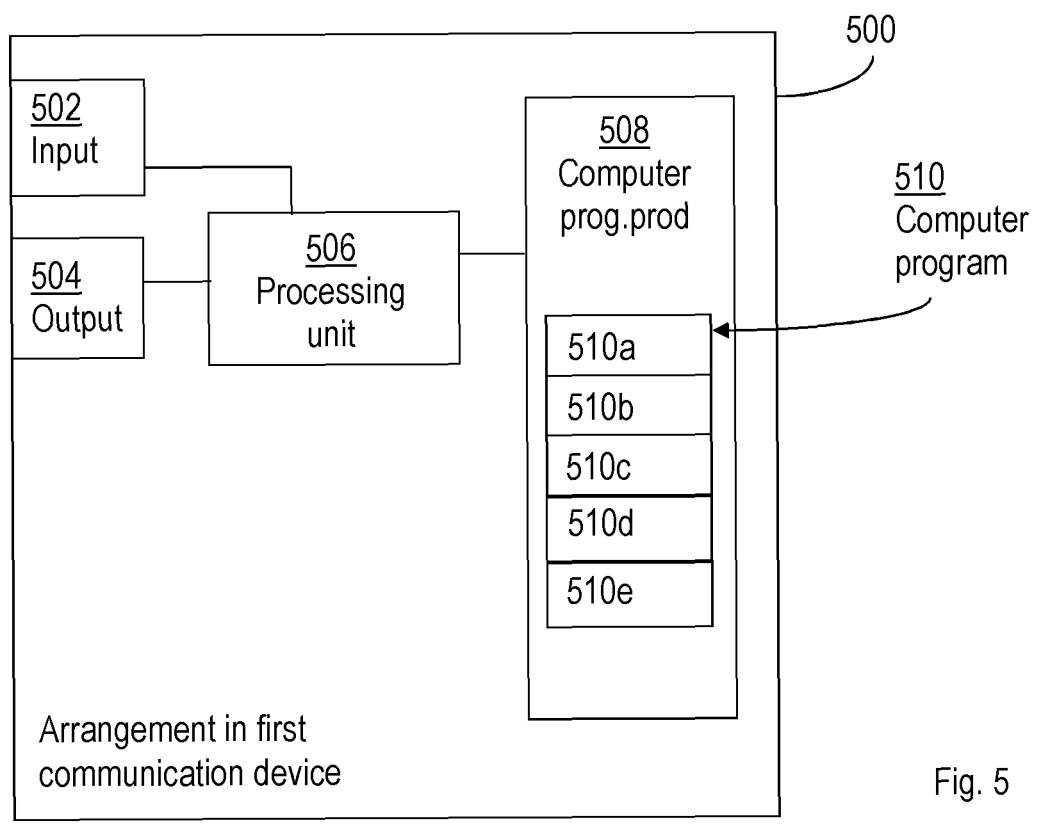
FIG. 5 is a block diagram of an arrangement in a first communication device for communicating with at least a second communication device, according to an exemplifying embodiment.

FIG. 5 schematically shows an embodiment of an arrangement 500 in a first communication device 400. Comprised in the arrangement 500 in the first communication device 400 are here a processing unit 506, e.g. with a Digital Signal Processor, DSP. The processing unit 506 may be a single unit or a plurality of units to perform different actions of procedures described herein. The arrangement 500 of the first communication device 400 may also comprise an input unit 502 for receiving signals from other entities, and an output unit 504 for providing signal(s) to other entities. The input unit and the output unit may be arranged as an integrated entity or as illustrated in the example of FIG. 4, as one or more interfaces 401.

Furthermore, the arrangement 500 in the first communication device 400 comprises at least one computer program product 508 in the form of a non-volatile memory, e.g. an Electrically Erasable Programmable Read-Only Memory, EEPROM, a flash memory and a hard drive. The computer program product 508 comprises a computer program 510, which comprises code means, which when executed in the processing unit 506 in the arrangement 500 in the first communication device 400 causes the first communication device to perform the actions e.g. of the procedure described earlier in conjunction with FIG. 2a.

The computer program 510 may be configured as a computer program code structured in computer program modules 510a-510e. Hence, in an exemplifying embodiment, the code means in the computer program of the arrangement 500 in the first communication device 400 comprises a demodulating unit, or module, for demodulating the radio resources on at least a subset of subcarriers of the predefined subcarrier pattern. The computer program further comprises a determining unit, or module, for determining whether the demodulated radio resources comprise the control sequence. Still further, the computer program further comprises a transmitting unit, or module, for transmitting data to the second communication device when it is determined that the control sequence is not comprised in the demodulated radio resources.

The computer program modules could essentially perform the actions of the flow illustrated in FIG. 2a, to emulate the first communication device 400. In other words, when the different computer program modules are executed in the processing unit 506, they may correspond to the units 403-405 of FIG. 4.

Although the code means in the embodiments disclosed above in conjunction with FIG. 4 are implemented as computer program modules which when executed in the respective processing unit causes the first communication device to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the first communication device.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a first communication device for communicating with a second communication device, the first and the second communication devices operable in a wireless communication network employing contention based access for radio resources comprising a plurality of frequency sub carriers, wherein, when transmitting data, the second communication device transmits a control sequence on at least one subcarrier of a predefined subcarrier pattern comprising a set of subcarriers occupying a frequency range starting from a starting subcarrier according to a subcarrier pattern that uniquely identifies the second communication device or its type, the subcarrier pattern indicating at least one subcarrier to be used or to be left unused, the method comprising:

at the first communication device:
demodulating the radio resources on at least a subset of the set of subcarriers of the predefined subcarrier pattern;
determining whether the demodulated radio resources comprise the control sequence, which is transmitted with the data at the same time by the second communication device, within the predefined subcarrier pattern that uniquely identifies the second communication device or its type, the subcarrier pattern indicating at least one subcarrier to be used or to be left unused;
responsive to determining that the demodulated radio resources comprise the control sequence, which indicates the second communication device is transmitting the data, within the predefined subcarrier pattern that uniquely identifies the second communication device or its type, refraining from transmitting data to the second communication device; and
responsive to determining that the demodulated radio resources do not comprise the control sequence, which indicates the second communication device is not transmitting the data, within the predefined subcarrier pattern that uniquely identifies the second communication device or its type, transmitting data to the second communication device, wherein transmitting data further comprises transmitting a control sequence on at least one subcarrier of a predefined subcarrier pattern comprising a set of subcarriers occupying a frequency range starting from a starting subcarrier according to a subcarrier pattern that uniquely identifies the first communication device or its type, the subcarrier pattern indicating at least one subcarrier to be used or to be left unused.

2. The method according to claim 1, wherein the starting subcarrier in the predefined subcarrier pattern of the second communication device is an odd numbered subcarrier.

3. The method according to claim 1, wherein the starting subcarrier in the predefined subcarrier pattern of the second communication device is an even numbered subcarrier.

4. The method according to claim 1, wherein the control sequence is an all "0" sequence, and all "1" sequence, or a sequence of arbitrary elements.

5. A first communication device for communicating with a second communication device, the first and the second communication devices operable in a wireless communication network employing contention based access for radio resources comprising a plurality of frequency subcarriers, wherein, when transmitting data, the second communication device transmits a control sequence on at least one subcarrier of a predefined subcarrier pattern comprising a set of subcarriers occupying a frequency range starting from a starting subcarrier according to a subcarrier pattern that uniquely identifies the second communication device or its type, the subcarrier pattern indicating at least one subcarrier to be used or to be left unused, the first communication device comprising:
one or more processors; and
memory storing instructions executable by the one or more processors, whereby the first communication device is configured for:
demodulating the radio resources on at least a subset of the set of subcarriers of the predefined subcarrier pattern;
determining whether the demodulated radio resources comprise the control sequence, which is transmitted with the data at the same time by the second communication device within the predefined subcarrier pattern that uniquely identifies the second communication device or its type, the subcarrier pattern indicating at least one subcarrier to be used or to be left unused;
responsive to determining that the demodulated radio resources comprise the control sequence, which indicates the second communication device is transmitting the data, within the predefined subcarrier pattern that uniquely identifies the second communication device or its type, refraining from transmitting data to the second communication device; and
responsive to determining that the demodulated radio resources do not comprise the control sequence, which indicates the second communication device is not transmitting the data, within the predefined subcarrier pattern that uniquely identifies the second communication device or its type, transmitting data to the second communication device, wherein, when transmitting data, the first communication device is further configured for transmitting a control sequence on at least one subcarrier of a predefined subcarrier pattern comprising a set of subcarriers occupying a frequency range starting from a starting subcarrier according to a subcarrier pattern that uniquely identifies the first communication device or its type, the subcarrier pattern indicating at least one subcarrier to be used or to be left unused.

6. The first communication device according to claim 5, wherein the starting subcarrier in the predefined subcarrier pattern of the second communication device is an odd numbered subcarrier.

7. The first communication device according to claim 5, wherein the starting subcarrier in the predefined subcarrier pattern of the second communication device is an even numbered subcarrier.

8. The first communication device according to claim 5, wherein the control sequence is an all "0" sequence, and all "1" sequence, or a sequence of arbitrary elements.

9. A non-transitory computer-readable medium comprising instructions executable by processing circuitry of a first communication device for communicating with a second communication device, the first and the second communication devices operable in a wireless communication network employing contention based access for radio resources comprising a plurality of frequency subcarriers, wherein, when transmitting data, the second communication device transmits a control sequence on at least one subcarrier of a predefined subcarrier pattern comprising a set of subcarriers occupying a frequency range starting from a starting subcarrier according to a subcarrier pattern that uniquely identifies the second communication device or its type, the subcarrier pattern indicating at least one subcarrier to be used or to be left unused, whereby the first communication device is operable to:
demodulate the radio resources on at least a subset of the set of subcarriers of the predefined subcarrier pattern;
determine whether the demodulated radio resources comprise the control sequence, which is transmitted with the data at the same time by the second communication device within the predefined subcarrier pattern that uniquely identifies the second communication device or its type, the subcarrier pattern indicating at least one subcarrier to be used or to be left unused;
responsive to determining that the demodulated radio resources comprise the control sequence, which indicates the second communication device is transmitting the data, within the predefined subcarrier pattern that uniquely identifies the second communication device or its type, refrain from transmitting data to the second communication device; and
responsive to determining that the demodulated radio resources do not comprise the control sequence, which indicates the second communication device is not transmitting the data, within the predefined subcarrier pattern that uniquely identifies the second communication device or its type, transmit data to the second communication device, wherein, when transmitting data, the first communication device is further operable to transmit a control sequence on at least one subcarrier of a predefined subcarrier pattern comprising a set of subcarriers occupying a frequency range starting from a starting subcarrier according to a subcarrier pattern that uniquely identifies the first communication device or its type, the subcarrier pattern indicating at least one subcarrier to be used or to be left unused.

* * * * *